United States Patent
Miller et al.

(10) Patent No.: US 8,042,594 B2
(45) Date of Patent: Oct. 25, 2011

(54) COMPACTION DEVICE FOR FIBER PLACEMENT USING INTERDEPENDENT SEGMENT TRAVEL

(75) Inventors: Lloyd G. Miller, Bountiful, UT (US); Douglas G. Harris, West Valley City, UT (US); Vernon M. Benson, Morgan, UT (US); Keith G. Shupe, Bountiful, UT (US); Kevin L. Wade, Kaysville, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 1076 days.

(21) Appl. No.: 11/476,455

(22) Filed: Jun. 28, 2006

(65) Prior Publication Data

US 2008/0000576 A1 Jan. 3, 2008

(51) Int. Cl.
*B32B 37/00* (2006.01)
(52) U.S. Cl. ........ 156/582; 156/73.6; 156/358; 156/580
(58) Field of Classification Search .......... 156/358, 156/523, 574, 577, 580, 580.1, 580.2, 581, 156/582, 583.1, 73.5, 73.6
See application file for complete search history.

(56) References Cited

U.S. PATENT DOCUMENTS

| 3,627,602 | A | * | 12/1971 | Van Dijk ................ 156/73.1 |
| 4,052,246 | A | | 10/1977 | Albareda et al. |
| 4,341,584 | A | | 7/1982 | Czernichowsky |
| 4,750,965 | A | | 6/1988 | Pippel et al. |
| 4,867,834 | A | | 9/1989 | Alenskis et al. |
| 4,869,774 | A | | 9/1989 | Wisbey |
| 4,943,338 | A | | 7/1990 | Wisbey |
| 4,954,204 | A | | 9/1990 | Grimshaw |
| 4,997,510 | A | | 3/1991 | Shinno et al. |
| 5,015,326 | A | | 5/1991 | Frank |
| 5,032,206 | A | | 7/1991 | Sigerist |
| 5,058,497 | A | | 10/1991 | Bishop et al. |

(Continued)

FOREIGN PATENT DOCUMENTS

JP 01247144 A 10/1989

OTHER PUBLICATIONS

PCT International Search Report for International Application No. PCT/US2007/072113, mailed Aug. 4, 2008.

*Primary Examiner* — James Sells
(74) *Attorney, Agent, or Firm* — IPLM Group, P.A.

(57) ABSTRACT

A method and system for a fiber compaction device with interdependent segment travel is described. A compaction device structure supports a series of individual interdependent segments including a compaction surface. Each segment also includes an opening in which a presser member can be located. The presser members consist of either an elastomeric bladder filled with an incompressible fluid or individual pistons that are manifolded together with a fixed volume of incompressible fluid. The presser members create an interdependence in segment positions such that if one or more segments are displaced the others move to balance the segment positions. Having a fixed volume of incompressible fluid allows the segments to work interdependently, thus guaranteeing that the average section position will be the nominal position and eliminating the need for a fixed center section. The segments can conform to complexly shaped part surfaces and apply a uniform pressure against the entire surface to better compact material being drawn through the fiber compaction device.

20 Claims, 11 Drawing Sheets

U.S. PATENT DOCUMENTS

| | | |
|---|---|---|
| 5,110,395 A | 5/1992 | Vaniglia |
| 5,314,563 A | 5/1994 | Grimshaw et al. |
| 5,316,612 A | 5/1994 | Peterson et al. |
| 5,330,609 A | 7/1994 | Dreyer et al. |
| 5,352,306 A | 10/1994 | Grimshaw et al. |
| 5,431,749 A | 7/1995 | Messner |
| 5,454,897 A | 10/1995 | Vaniglia |
| 5,645,677 A | 7/1997 | Cahuzac et al. |
| 5,738,749 A | 4/1998 | Grimshaw et al. |
| 5,975,179 A | 11/1999 | Kelly, Jr. |
| 5,989,384 A | 11/1999 | Grimshaw et al. |
| 6,096,164 A | 8/2000 | Benson et al. |
| 6,105,648 A | 8/2000 | De Graaf et al. |
| 6,390,169 B1 | 5/2002 | Johnson |
| 6,432,236 B1 | 8/2002 | Leemon et al. |
| 6,579,409 B2 * | 6/2003 | Cullins et al. ............... 156/583.3 |
| 2007/0044899 A1 | 3/2007 | Tingley |
| 2007/0044922 A1 | 3/2007 | Mischler et al. |

* cited by examiner

COMPACTION DEVICE FOR FIBER PLACEMENT USING INTERDEPENDENT SEGMENT TRAVEL

BACKGROUND OF THE INVENTION

1. Field of the Invention

The invention relates generally to fiber placement technology, and more specifically, to a compaction device with interdependent segments that are movable relative to one another so as to enable conformity with an irregular surface during fiber placement.

2. State of the Art

Fiber placement machines and techniques are well known in the art and enjoy considerable usage in the production of composite parts or structures. Composite structures are particularly useful in high performance applications, such as in the aerospace industry because of their high strength to weight ratio, good corrosion resistance, good impact resistance, and high electrical and thermal resistance exhibited by composite parts. As such, composite components are frequently replacing metallic components in various structures, apparatuses and systems.

In producing composite components, fiber placement machines are capable of individually and selectively feeding and cutting separate fiber bundles or tows so as to form a fiber band on a surface of the part. This selective cutting and feeding of tows advantageously enables the fiber compaction device to put down the tows in an arcuate path on the part surface that prevents buckling, wrinkling or misalignment of fibers. The fiber tows, also known as tow pregs, are generally a bundle of continuous fibers impregnated with a resin (i.e., a polymeric material that may be in a cured, uncured, or partially cured state).

One example of a fiber placement machine includes a compaction device comprising a plurality of roller segments disposed in a side-by-side relationship, each roller being supported for pivotable movement about an eccentrically disposed pivot shaft. The roller segments are movable independent of one another such that the compaction device can conform to surface geometries while attempting to apply a pressure against the individual tows as they are pressed onto the surface of a mandrel or underlying layer of a given part. Such prior art compaction devices commonly employ a fixed centermost roller segment while the other segments are permitted to move in and out, being pushed forward by pneumatic pressure or spring force while being able to slide as an assembly. Such a device is described in U.S. Pat. No. 5,454,897 issued to Vaniglia.

Some compaction devices having independently movable segments incorporate the use of pressure bladders (i.e., fluid pressurized elastic chambers), for example one bladder on each side of the fixed center segment, to apply a compaction force to the roller segments. The bladders urge the associated roller segments pivotally in the fore direction, relative to the fixed center segment, in an attempt to conform with the surface geometry of the part and to provide a generally uniform pressure against the surface.

One problem with prior art compaction devices using a fixed centermost roller segment is that the segments must be balanced so that the force exerted by each roller segment is the same. Additionally, with a fixed center segment, the conformability of the roller system to complex geometric surfaces is rather limited. Furthermore, because the segments work independently of one another, there is nothing to keep the average segment position at the nominal position (i.e., the position of a segment when there is no displacement from the center shaft).

In fiber placement compaction devices using inflatable bladders, many additional problems exist. For example, when the bladder pressure is too low, the center segment carries a higher load. This can ultimately result in damage to the center segment, to the part being fabricated (for example, if fiber is being placed over core), or both. This is particularly a problem when the bladders fail to inflate, as such an event could result in irreparable damage to the rollers which are expensive to replace.

On the other hand, if the bladders are over-inflated, the center section may lift completely off the surface of the composite part, thereby resulting in failure to compact one or more tows that are being laid on the surface of the part. Thus, bladders require pressure regulation and continuous inflation. Therefore, the bladders require an opening through which the gas can enter and exit and a sealed system to supply the pressurized gas. These sealed connections have often breached such that they have to be resealed, which is a time consuming operation. In general, bladders require costly maintenance and repair that may include disassembly of the roller.

Therefore, it would be desirable to provide an enhanced fiber placement compaction device. For example, a need exists for improving the positioning and balancing of segment forces, increasing the conformability of the roller segments, and simplifying the maintenance and control of a compaction device.

BRIEF SUMMARY OF THE INVENTION

The present invention is directed to a method and apparatus for a fiber placement compaction device with interdependent segments that are moveable relative to one another so as to enable conformity with an irregular surface during fiber placement.

In one embodiment of the present invention, a fiber compaction device system is provided. The system includes a series of individual interdependent segments and a presser mechanism that balances the forces exerted by the series of individual interdependent segments. The system further includes a structure that provides the support for the individual interdependent segments and the presser mechanism.

In another embodiment of the present invention, a method of making a fiber compaction device system is disclosed. The method includes forming both a series of individual interdependent segments and a presser mechanism configured to balance the forces exerted by the series of individual interdependent segments. The method further includes forming a structure supporting the individual interdependent segments and the presser mechanism.

In a further embodiment of the present invention, a tool for inserting and filling bladders, which are enclosed in the fiber compaction device, is provided. The tool includes a thin-walled rigid tube that is shaped to fit into an area of an assembled compaction device that holds an inflatable bladder. A deflated bladder is placed into the tube and then filled with an incompressible fluid. After the bladder is sealed, the tool is inserted into the compaction device. The tool further includes a rigid insert that fits into the tube with a tight, sliding fit and is longer than the tube. The rigid insert is configured to hold the bladder in place while the tube is removed from the compaction device.

BRIEF DESCRIPTION OF THE SEVERAL VIEWS OF THE DRAWINGS

The drawings illustrate various embodiments of the invention.

DETAILED DESCRIPTION OF THE INVENTION

Figure 1:
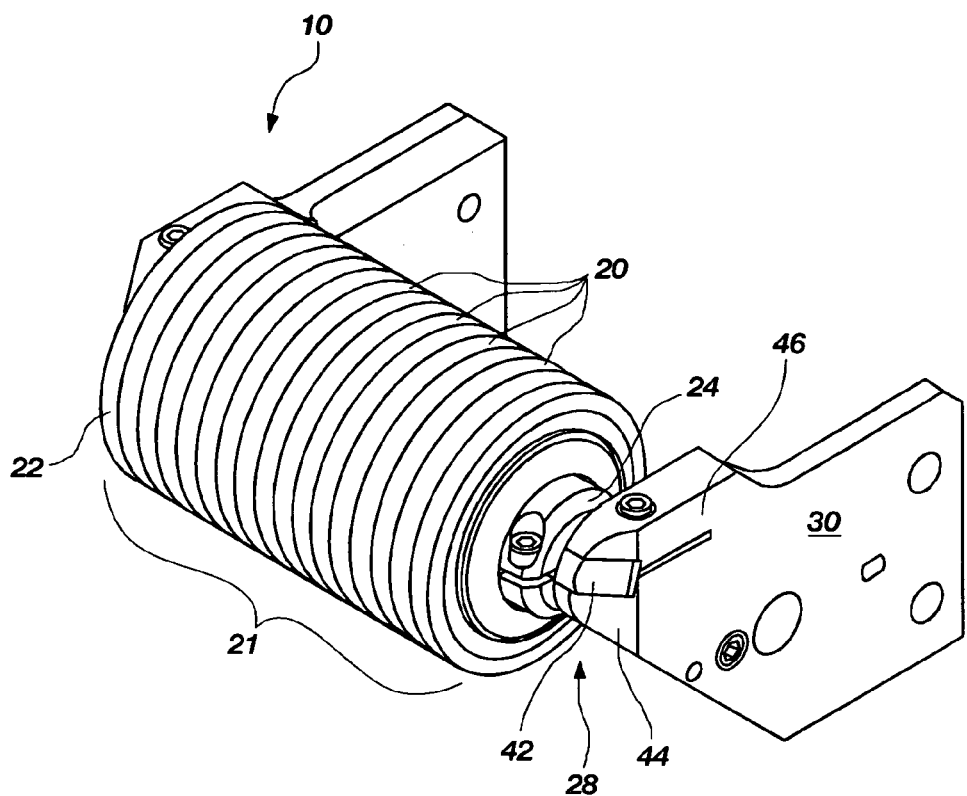
FIG. 1 illustrates a perspective view of a compaction device in accordance with an embodiment of the present invention.

Fiber placement machines that include a compaction device are used to produce composite parts. In the various embodiments of the present invention, all the individual segments of the compaction device are interdependently related to each other during operation. In one embodiment of the present invention, a compaction device includes a plurality of individual segments disposed in a side-by-side relationship to compact tows of fiber on a flat, curved, or compound contour. The individual segments can be configured as rollers that roll across the part surface or as non-rotating members that slide on the surface. In order to adjust to the contour of the part surface, the individual segments may be configured to slide back and forth or, in another embodiment, to pivot about an axis which is not in the center of the segment (axis off of center). Each roller segment can be optionally fixed in place to prevent it from moving relative to the other segments. The option of fixing any or all segments, or any combination of segments, provides increased flexibility of the compaction device in conforming to complex geometric surfaces. In one embodiment, each individual segment is a roller which contains a ring bearing that enables the outer surfaces of the segments to rotate independent of one another. Each roller may contain an opening in which an actuator member may be located and apply a force to the segment in a specified direction. Additionally, each roller may have an elastomeric surface that is designed to give additional compliance between the segments of the compaction device and the surface of the part being formed.

In another embodiment of the present invention, a compaction device includes a plurality of individual segments having a rigid shoe that glides on the surface of the fiber structure. The individual segments are moveable independent of one another to conform to shape variations of the structure. Pressure is applied equally to each segment via an interdependent system linked to the segments. Each segment is individually lockable in a fixed position. The rigid shoe for each segment may be rigidly attached to the segment, articulated in multiple directions, or pivot on a single axis. The rigid shoes may be covered with a material that may provide both additional surface compliance and reduce friction between the shoes and the fiber structure. The shoes may include an apparatus to provide cooling, heat or vibration. Additionally, a thin flexible material may be fixedly placed between the fiber structure and the shoes in order to reduce friction between the fiber structure and the compaction device. Use of the thin flexible material will more evenly distribute the shoe pressure and improve the surface finish of the fiber structure.

In a further embodiment of the present invention, a compaction device includes a plurality of individual segments with a center segment that is not fixed in place relative to the other segments, or relative to a given stationary axis of the compaction device. Such a structure effectively doubles the traveling area of the roller segments as compared to devices in which the center segment is fixed. Furthermore, because the device is configured so that pressures applied to individual segments are self-balancing, the invention eliminates the possibility of pressure differences between the center section and the other sections. As a result, the compaction device is durable and prevents damage to the mandrel on which the part is being fabricated or to the part itself. Through ideal balancing, and the lack of a fixed center section, increased conformability is achieved and consolidation of the material is improved.

In a further embodiment of the present invention, a compaction device is provided that includes a series of individual segments which compact the fiber against a part surface. Each individual segment contains an opening in which an actuator member can be located. The actuator member balances the pressure applied to each segment by exerting a force to push the individual segment towards the surface of the part being formed, thereby conformally adjusting to the contour of the part surface. The actuator members may include, for example, an elastomeric tube (e.g., a bladder) filled with: a substantially incompressible fluid, a highly elastic substantially solid material that acts as an incompressible fluid, or a granular substantially solid material that acts like an incompressible fluid. In another embodiment, the actuator members may include individual pistons and cylinders that are each connected together with a fixed volume of substantially incompressible fluid. By using a fluid (or a material that behaves substantially like a fluid) having a fixed volume, the need for a regulated pneumatic supply and associated control and plumbing is eliminated. Hence, the control, maintenance, and construction of the compaction device can be simplified, if desired.

In one embodiment of the invention, a compaction device that includes a bladder and a compaction roller segment, a bladder containment surface or surfaces that enclose the bladder on the ends is included. These containment surfaces can be adjustable to have the effect of adjusting the bladder working volume by changing its shape. A calibration jig or fixture may also be disposed on the device to enable repeatable adjustment of the bladder containment surfaces based on the effective roller radii of the segments with respect to the physical roller axle. In one embodiment, the containment surfaces can be adjusted by an optional servo-controller.

In yet another embodiment, a compaction device may also include a vibration fixture which vibrates the entire compaction device. The vibration fixture may include but is not limited to a vibrator type including, an eccentric lobe, hydraulic, air actuated, or electromagnetic. The compaction device may also include a vibration fixture which vibrates the fluid or other material disposed in the bladder or the fluid supply for the hydraulic actuators. Vibration of the compaction device enhances compaction and consolidation of the composite material.

An optional secondary bladder surrounding the primary bladder may also be included to capture any fluid that may leak from the primary bladder, and then vent the leaking fluid to a leak detection device.

Furthermore, an embodiment of the present invention includes a tool for filling and inserting bladders into the assembled compaction device. For example, when a bladder needs to be replaced, the old bladder may be pulled out and the insertion tool containing a new bladder may be inserted into the compaction device. With the embodiments described, the present invention simplifies the construction, maintenance, and control of the compaction device and potentially lowers the cost for the user.

Various embodiments of the present invention will now be further described with reference to the drawings and the preferred practice of the invention.

Referring now to drawing FIG. 1, a perspective view of a compaction device 10 is illustrated in accordance with one embodiment of the present invention. Compaction device 10 is supported by a structure 28 and includes roller segments 20 which, collectively, form what may be referred to as a roller 21 or roller assembly. The roller segments 20 are configured in a spaced apart, side-by-side relationship with an endmost roller segment 22 on each side and axially constrained by collar[s] 24. The roller segments 20 are movable independent of one another such that the roller 21 of the compaction device 10 can conform to complex geometric surfaces of a part being formed and apply a uniform pressure against the entire surface, therefore improving consolidation of the material being fabricated. To provide support to the individual segments 20, support means is provided by a support structure 28 that may include, for example, end plates 30 (only one is seen in FIG. 1), a mounting ear 42, which engages with slots 44 formed in a pair of support arms 46.

Figure 2:
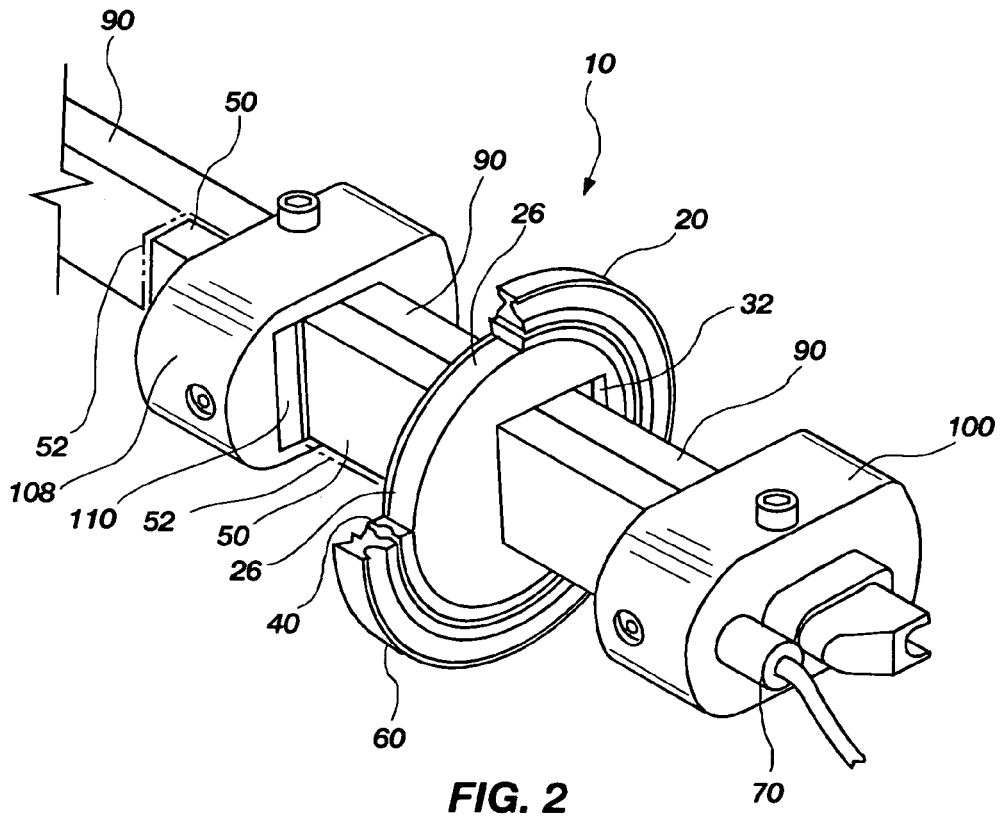
FIG. 2 illustrates a partial cross-sectional view of a compaction device including a partial section of one segment and a bladder in accordance with an embodiment of the present invention.
Figure 3:
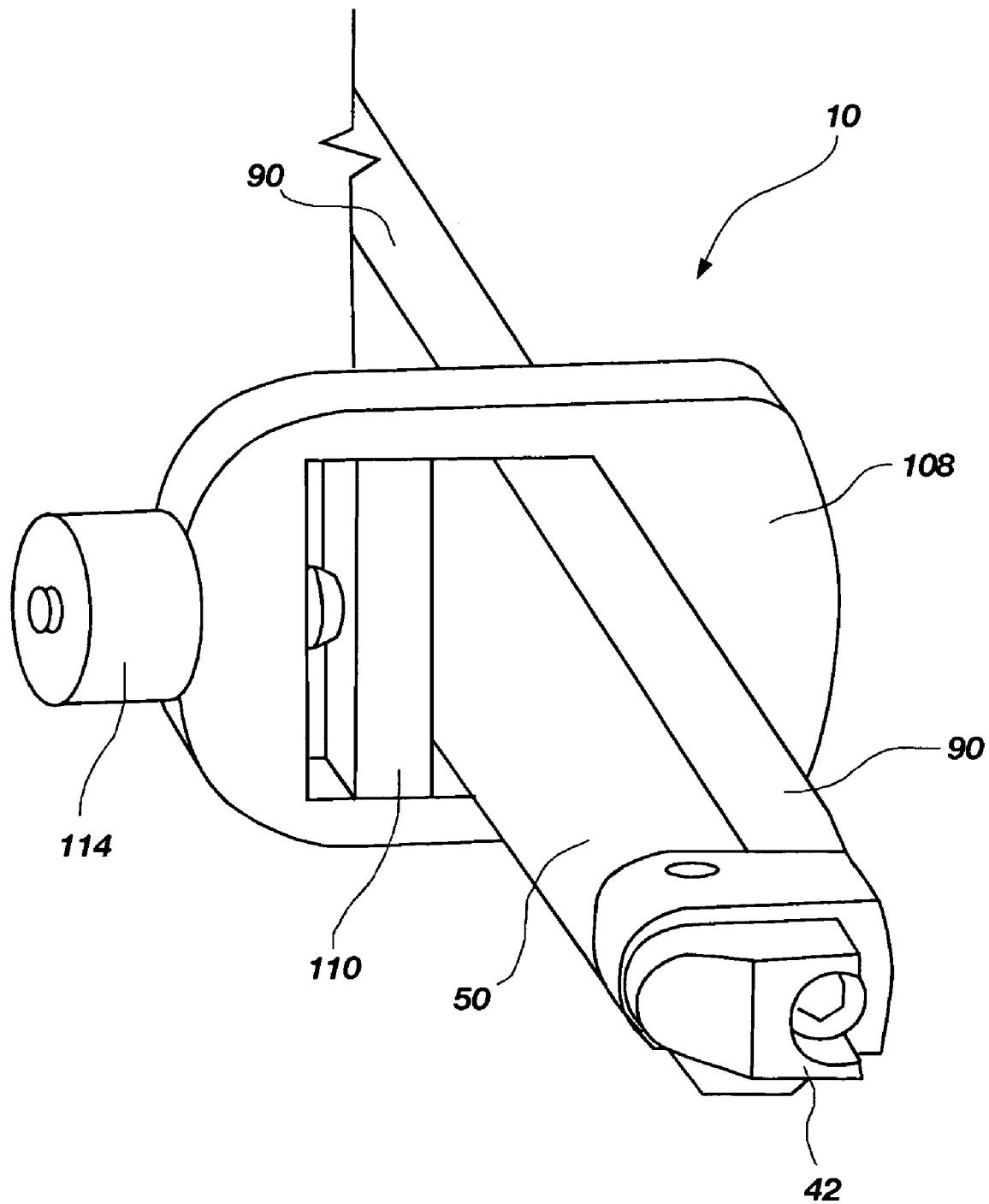
FIG. 3 illustrates details of a portion of a compaction device including an adjustable bladder containment surface in accordance with an embodiment of the present invention.

FIG. 2 shows a partial cross-sectional view with a single segment 20 of the compaction device 10 (other segments being removed for purposes of clarity) with the segment 20 being cooperatively disposed about an elastomeric bladder 50. The bladder 50 extends substantially parallel to a stationary axis 90 about which the roller segments may slide in a direction substantially perpendicular thereto. The bladder 50 is filled with, for example, a substantially incompressible fluid, a highly elastic substantially solid material that acts as an incompressible fluid, or a granular substantially solid material that acts like a substantially incompressible fluid. The use of a fixed volume also eliminates the need for bladder pressure regulation and the pneumatic supply lines 70 to the bladders can be removed. Additionally, the compaction device 10 can include a secondary bladder 52 that surrounds the primary bladder 50 and catches leaking fluid, venting it to a leak detection device (not shown). Pressure in the bladder 50 can be controlled using the bladder containment surface 110 disposed in the bladder pressure collar 108, movement inward of the containment surface 110, compresses the bladder 50 and increases the respective pressure. Conversely, outward movement of the containment surface 110 reduces pressure in bladder 50. Movement of the containment surface can be accomplished manually or by servo 114 (FIG. 3). The entire bladder 50 must be substantially constrained in order to focus the pressure change inside the bladder 50 to the individual segments 20. Each end of bladder 50 is constrained by a containment collar 100.

Roller segment 20 contains a sliding segment 26 with an opening 32 located in the center. The bladder 50 and the stationary axis 90 fit through the opening 32 of the sliding segment which allows the roller segments 20 to slide back and forth as the presser member (e.g., the bladder 50) exerts a force to push the individual segment 20 towards the surface of a part being formed. Each roller segment 20 can be optionally fixed in place to prevent it from moving relative to the stationary axis 90. Roller segments 20 may also include an elastomeric surface 60 with a specified material hardness so as provide additional compliance to the work surface against which the segments 20 are pressed. A bearing, such as a ring bearing 40, may be disposed on the outer perimeter of each roller segment 20 to enable the outer surfaces of the segments 20 to rotate relative to the sliding segment thereof and independent of other segments 20.

When the roller assembly 21 is engaged with the surface of a composite structure, and when the surface contour of the composite structure changes, the roller segments 20 individually slide forward or backward to maintain contact with the surface in a conformal manner. As the sliding segment 26 of the roller is displaced, the sliding segment 26 puts pressure on, or relieves pressure from, the bladder 50 and the incompressible fluid (or other material) is thereby transferred between portions of the bladder corresponding to individual segments 20 to balance the respective forces of each individual segment thereby making the movement of the individual segments 20 interdependent on the movement of other individual segments 20. Because the segments 20 are interdependent (by way of the bladder 50), the average segment position is kept at the nominal position (i.e., if one segment is displaced forward one unit, then the remaining segments are displaced back an average of one unit, thus keeping the average segment position at zero or nominal) which decreases the magnitude of any end of ply (EOP) errors. In one embodiment, a vibrator 31 (FIG. 5) may be attached to end plate 30 which is coupled with the stationary axis 90. Any suitable vibrator 31 may be used for vibrating the compaction device to further enhance compaction and consolidation of the composite material. The vibrator 31 serves the purpose of assuring that the composite being formed does not contain any air pockets.

Illustrated in drawing FIG. 3 is a portion of the compaction device 10 having an adjustable bladder containment surface 110 disposed in bladder pressure collar 108, in accordance with an embodiment of the present invention. The compaction device 10 includes a bladder 50 that extends substantially parallel with a stationary axis 90. Roller segments (not shown) slide back and forth in a direction substantially perpendicular to the length of the bladder 50 and axis 90. In one embodiment of the present invention, compaction device 10 includes at least one bladder containment surface 110. The bladder containment surface 110 compresses the bladder and can be adjustable so as to have the effect of allowing adjustment of the working volume of the bladder by changing its shape or effective volume. A calibration jig or fixture (not shown) may also be used to enable repeatable adjustment of the bladder containment surfaces based on the effective roller radius of the segments 20 with respect to the stationary axis 90. In one embodiment, a servo-controlled device 114 may be used to adjust the bladder containment surface 110.

Figure 4A:
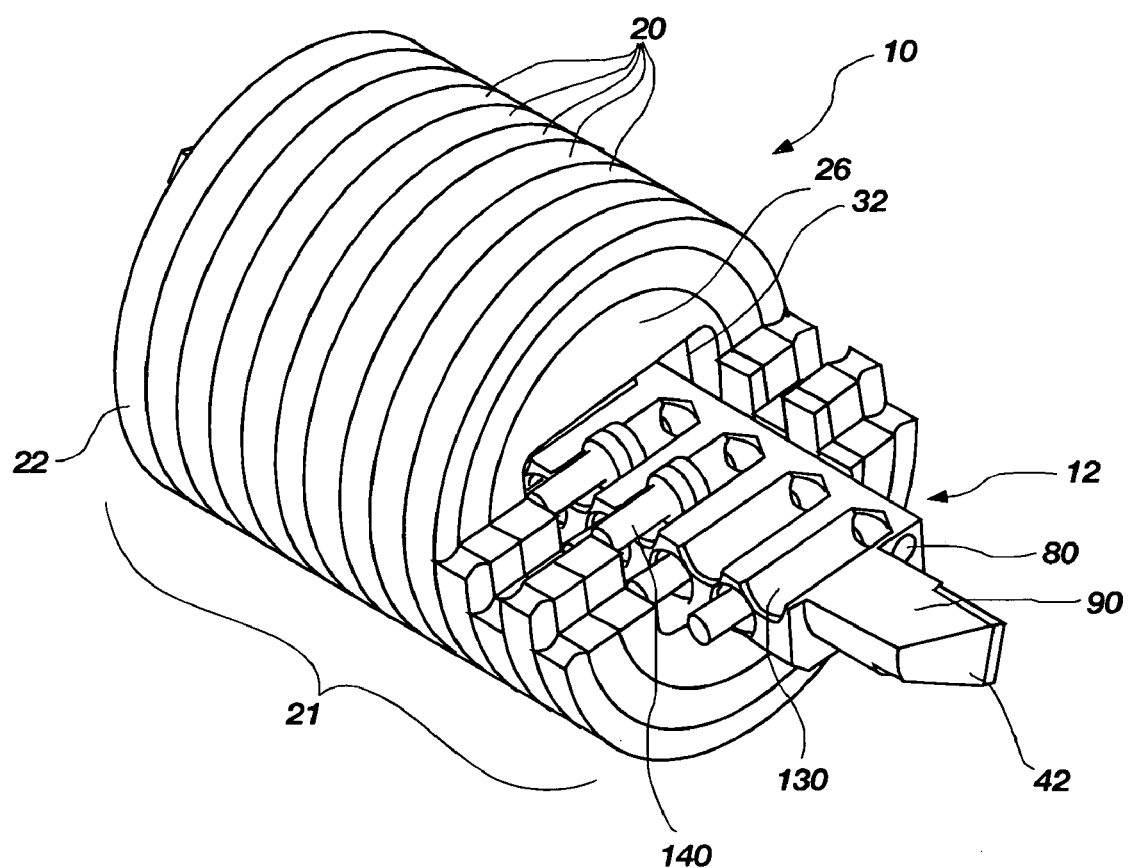
FIG. 4a illustrates a partial cross-sectional view of a compaction device in accordance with an embodiment of the present invention.

Illustrated in drawing FIG. 4(a) is an internal view of a compaction device 10 in accordance with another embodiment of the present invention. The compaction device 10 includes a plurality of actuator members 12 which may include individual pistons 140 and cylinders 130 that are interconnected by a manifold including passageway 80. The system, including cylinders 130 and passageway 80, is filled with a fixed volume of substantially incompressible fluid. The pistons 140 rest in the interconnected cylinders 130 and are displaced back and forth according to the contour of the part surface.

Compaction device 10 may include a plurality of segments 20 including an endmost roller segment 22. The roller segments 20 are configured in a spaced apart, side-by-side relationship with an endmost roller segment 22 on each side. Each roller segment 20 includes a sliding segment 26 with an opening 32 in which an actuator member 12 can be located and which exerts a force against an associated individual roller segment 20 in a direction towards the surface of a part being fabricated. The actuator members 12 create interdependence in segment positions such that if one or more segments 20 are displaced, the others move to balance the segment positions due to the displacement of fluid throughout the manifold. The roller segments 20 are movable independent of one another such that the compaction device 10 can conform to complexly shaped part surfaces and apply a uniform pressure against the entire surface to better compact material being laid up during the formation of a composite component. Each roller segment 20 can be optionally fixed in place to prevent the roller segment 20 from moving relative to the stationary axis 90.

Figure 4B:
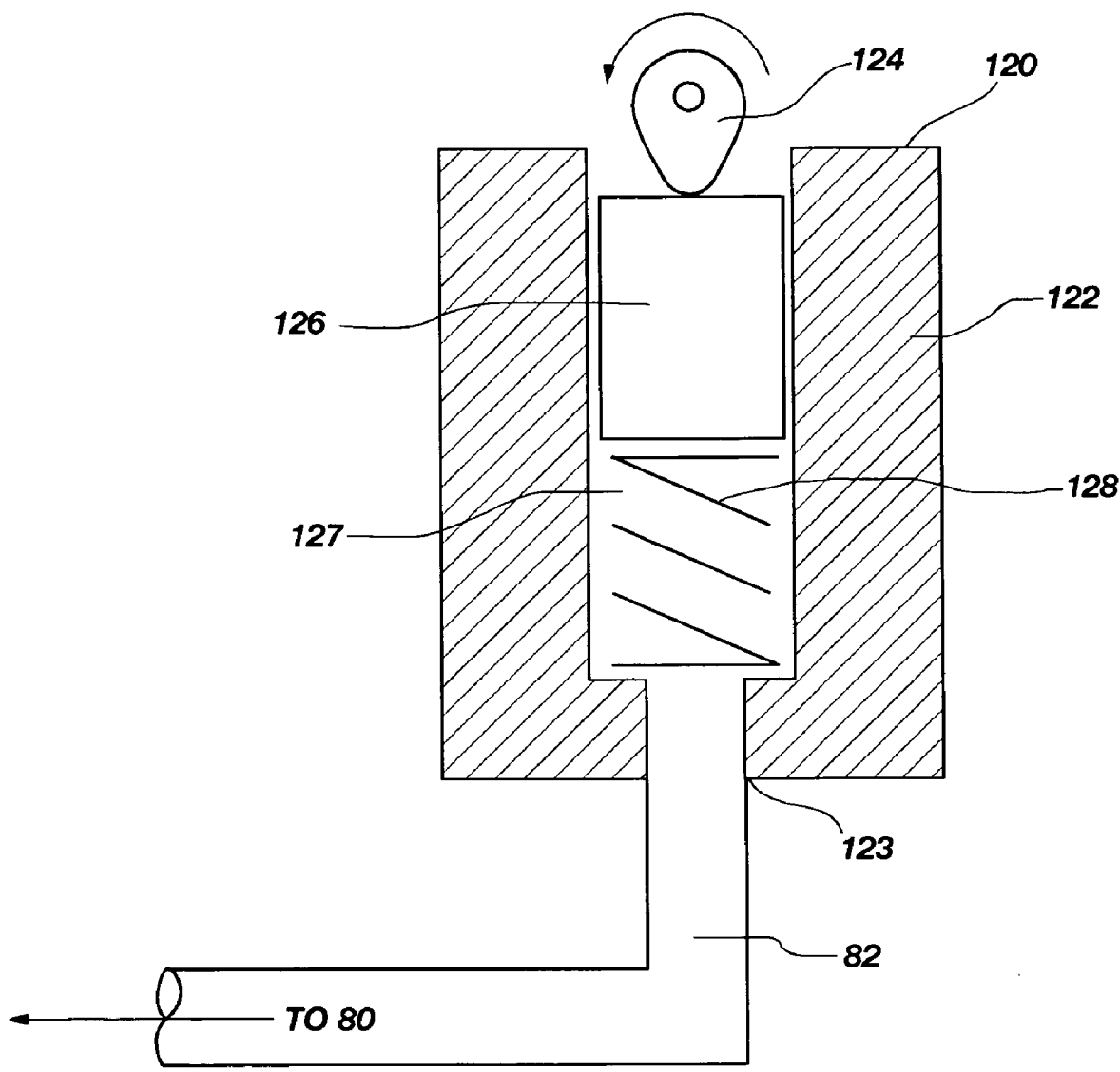
FIG. 4b illustrates a section view of a fluid vibration mechanism in accordance with an embodiment of the present invention.

Additionally, FIG. 4(b) illustrates a hydraulic vibratory element 120 which may be installed in the hydraulic system of the compaction device 10. The vibratory element 120 includes a housing 122 including cylinder 127 and port 123. Piston 126 is free-floating and is displaced by rotating cam 124 in the cylinder 127 creating cyclical pressure "spikes" that travel through port 123 and hydraulic line 82 to passageway 80 in the hydraulic manifold (FIG. 4(a)). The pressure "spikes" are then translated to pistons 140 and ultimately observed as vibrations at the mating surface between the compaction device and the composite structure (FIG. 4(a)). A piston return-spring 128 may also be required in cylinder 127.

Figure 5:
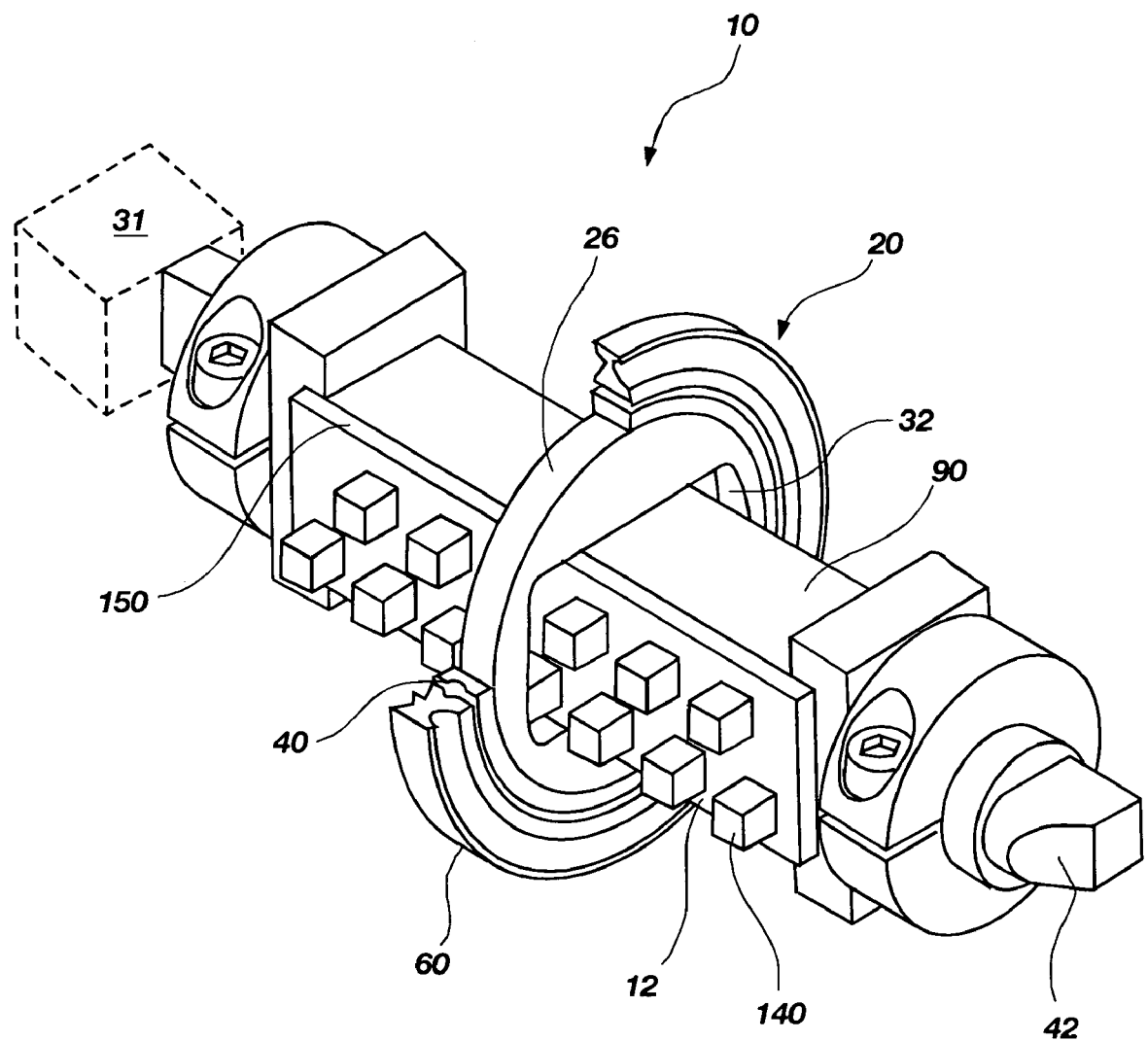
FIG. 5 illustrates a partial cross-sectional view of a compaction device including a partial section of one segment and showing actuator pistons in accordance with an embodiment of the present invention.

Illustrated in drawing FIG. 5 is a partial sectional view of the compaction device 10 shown and described with respect to drawing FIG. 4(a). As shown in drawing FIG. 5, the plurality of actuator members 12 may include individual pistons 140 that are connected together in a manifold type manner with a fixed volume of substantially incompressible fluid. The pistons 140 rest in interconnected cylinders (not shown in FIG. 5) and are displaced back and forth as the individual segments 20 conform to the surface geometry of a given composite structure being fabricated or a mandrel on which the structure is to be formed. Compaction device 10 also includes a roller segment 20 (only one shown in FIG. 5 for purposes of clarity) which may include a bearing, such as ring bearing 40, and an elastomeric surface 60. The ring bearing 40 allows the outer surfaces to rotate independent of one another and the elastomeric surface 60 is designed to give additional compliance to the work surface such as described hereinabove with respect to other embodiments.

A piston guide 150 extends substantially parallel with a stationary axis 90 and through an opening 32 of the sliding segment 26 of each roller segment 20. When the contour of a part surface changes, the roller segment 20 (and associated sliding segment 26) slides forward or backward to maintain contact with the surface. As the sliding segment 26 of the roller is displaced, the sliding segment 26 puts pressure on or relieves pressure from the pistons 140 and the substantially incompressible fluid is transferred between the cylinders associated with the various roller segments 20 to balance the force being applied to each individual roller segment 20. A suitable vibrator 31 (shown in dotted lines) used for vibrating the compaction device, to further enhance compaction and consolidation of the composite material may be attached to the support structure.

Figure 6:
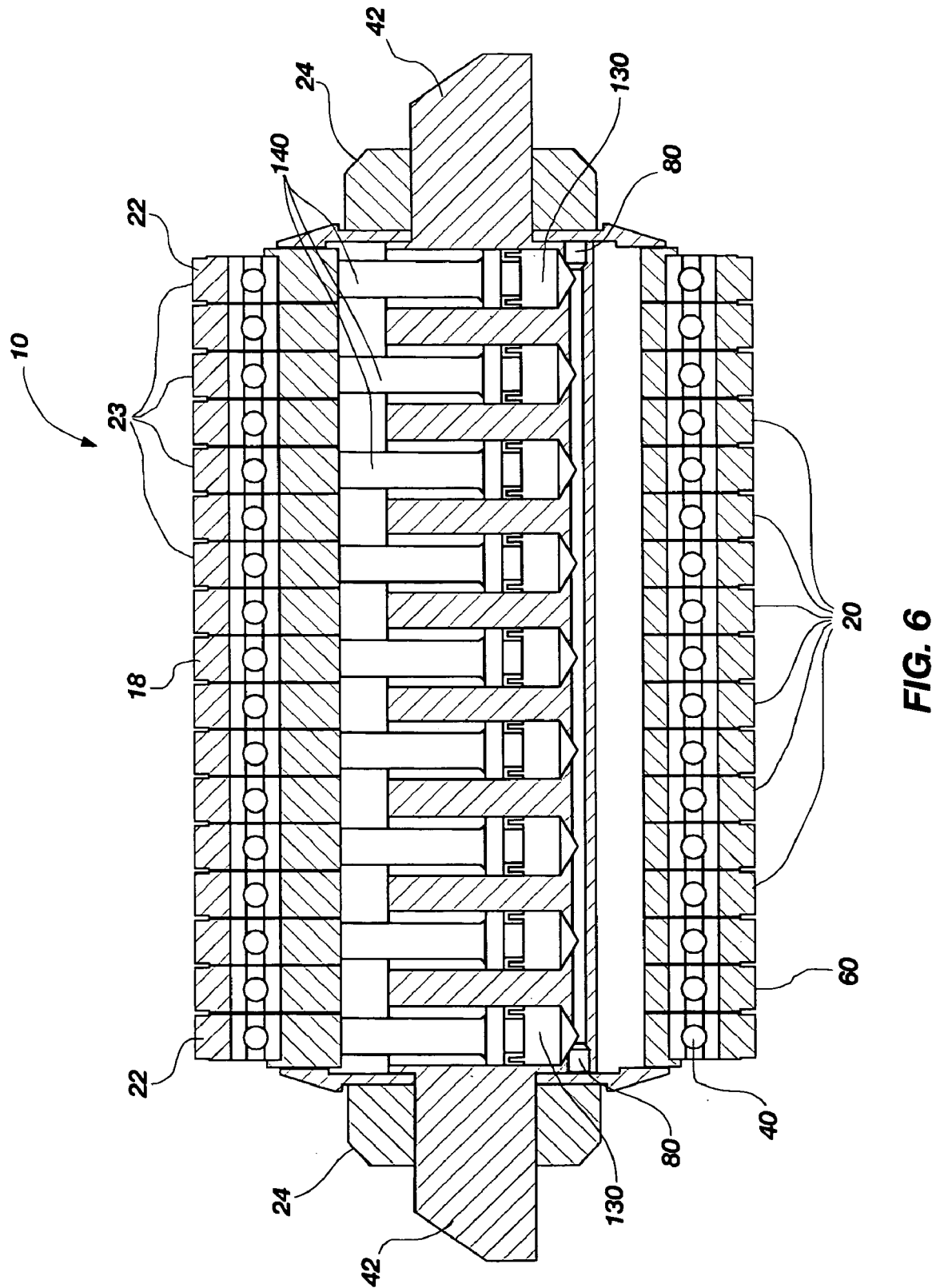
FIG. 6 illustrates a longitudinal sectional view of a compaction device, in accordance with an embodiment of the present invention.

Illustrated in drawing FIG. 6 is a longitudinal section view of the compaction device 10 shown and described with respect to drawing FIGS. 4 and 5. As seen in drawing FIG. 6, compaction device 10 includes roller segments 20 configured in a spaced apart, side-by-side relationship with an endmost roller segment 22 on each side, and a centermost segment 18. Drawing FIG. 6 illustrates only a top layer of a compaction device with actuator members 12 and thus, alternating roller segments 23 are aligned with pistons 140. A lower layer (not shown) of actuator members align with the other roller segments 20. Each roller segment 20 and 23 includes a cylinder 130 in which pistons 140 can be located. When pressure is applied through passageway 80 into the cylinder 130, piston 140 exerts a force to push the individual roller segment 20 towards the surface of a part that is being fabricated. Alternatively, each roller segment 20 can optionally be fixed in place to prevent it from moving. Each roller segment 20 may contain a bearing, such as a ring bearing 40 that enables the outer surfaces to rotate independent of a sliding segment and independent of one another. Additionally, the roller segments 20 can have an elastomeric surface 60 that is designed to give additional compliance to the part surface.

Figure 7A:
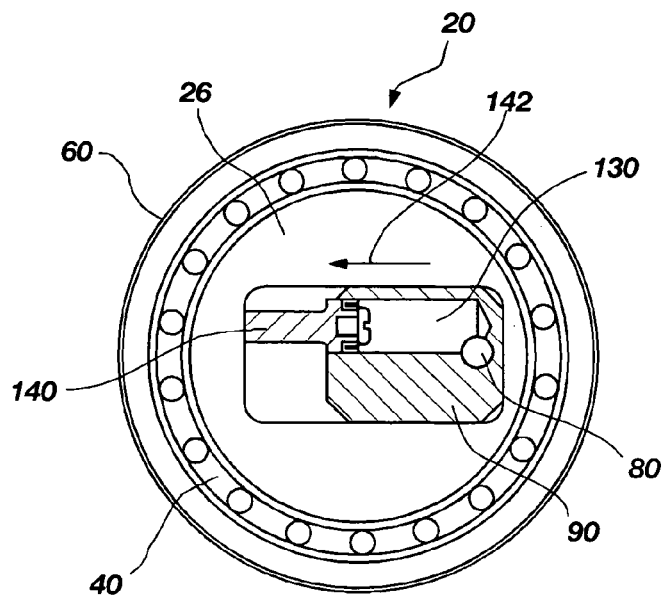
FIGS. 7a-7c illustrate sectional side views of a compaction device, showing the internal workings of a roller segment while the segment is in various positions, in accordance with an embodiment of the present invention.
Figure 7B:
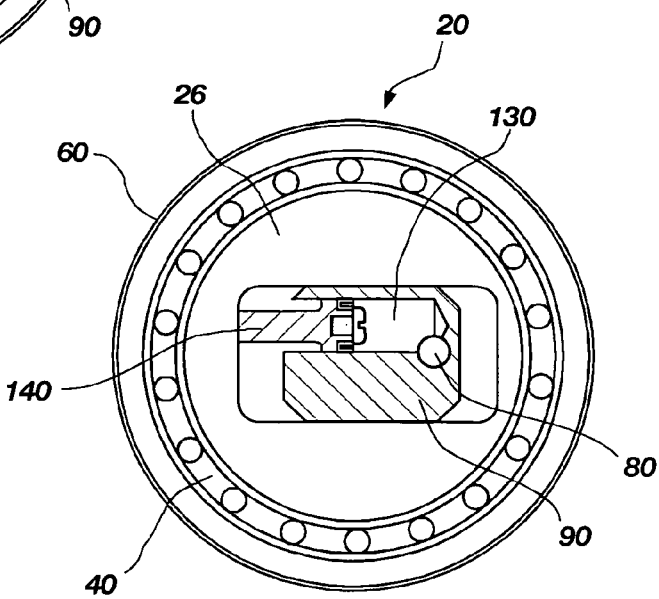
Figure 7C:
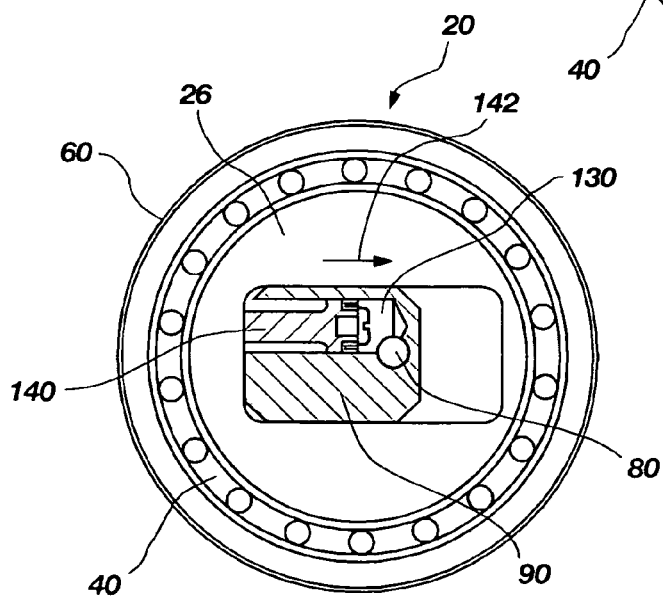

Illustrated in drawing FIGS. 7(a)-7(c) are sectioned side views of a single roller segment 20, illustrating internal workings of a roller segment 20 while in various positions, in accordance with an embodiment of the present invention. Each roller segment 20 contains a ring bearing 40 and an elastomeric surface 60. Additionally, each roller segment 20 includes a sliding segment 26 that contains an opening 32 in which a pressure member 12 is located. Illustrated in drawing FIG. 7(a) is a side view of a roller segment 20 in an extended position (i.e., with piston 140 extended from its respective cylinder 130 and pushing against the sliding segment 26) in the direction of arrow 142. Upon displacement of the roller segment, fluid is caused to flow from one or more of the other cylinders 130 through passageway 80 and causing their respective pistons 140 (and, therefore, rolling segments) to be displaced relative to stationary axis 90 so that a balanced interdependent pressure is applied across the face of the roller assembly 21.

Illustrated in drawing FIG. 7(c) is a side view of a roller segment 20 in a retracted position. Upon displacement of the roller segment 20, fluid is caused to flow through passageway 80 and into one or more of the other cylinders 130, causing their respective pistons 140 (and, therefore, rolling segments 20) to be displaced relative to stationary axis 90 so that balanced interdependent pressure is applied across the face of the roller assembly 21.

Illustrated in drawing FIG. 7(b) is a side view of a roller segment 20 in a mid travel position where the roller segment 20 is neither extended nor retracted; i.e., a roller segment 20 is in mid-travel.

Figure 8A:
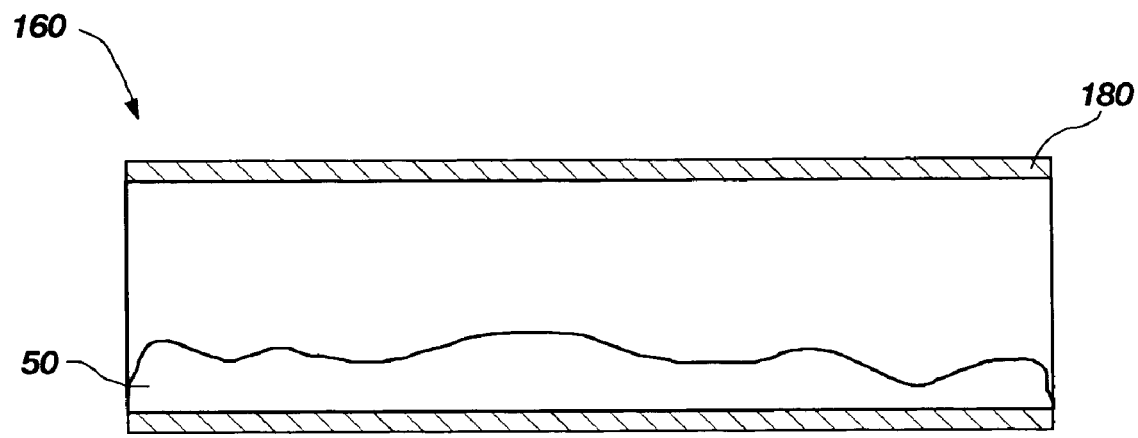
FIGS. 8a-8c illustrate a bladder insertion tool, and the use thereof, in accordance with an embodiment of the present invention.
Figure 8B:
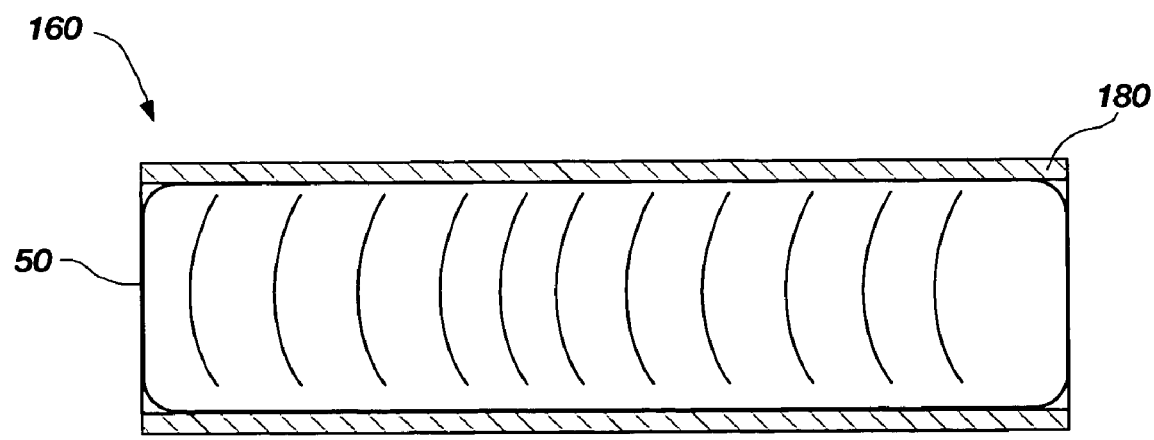
Figure 8C:
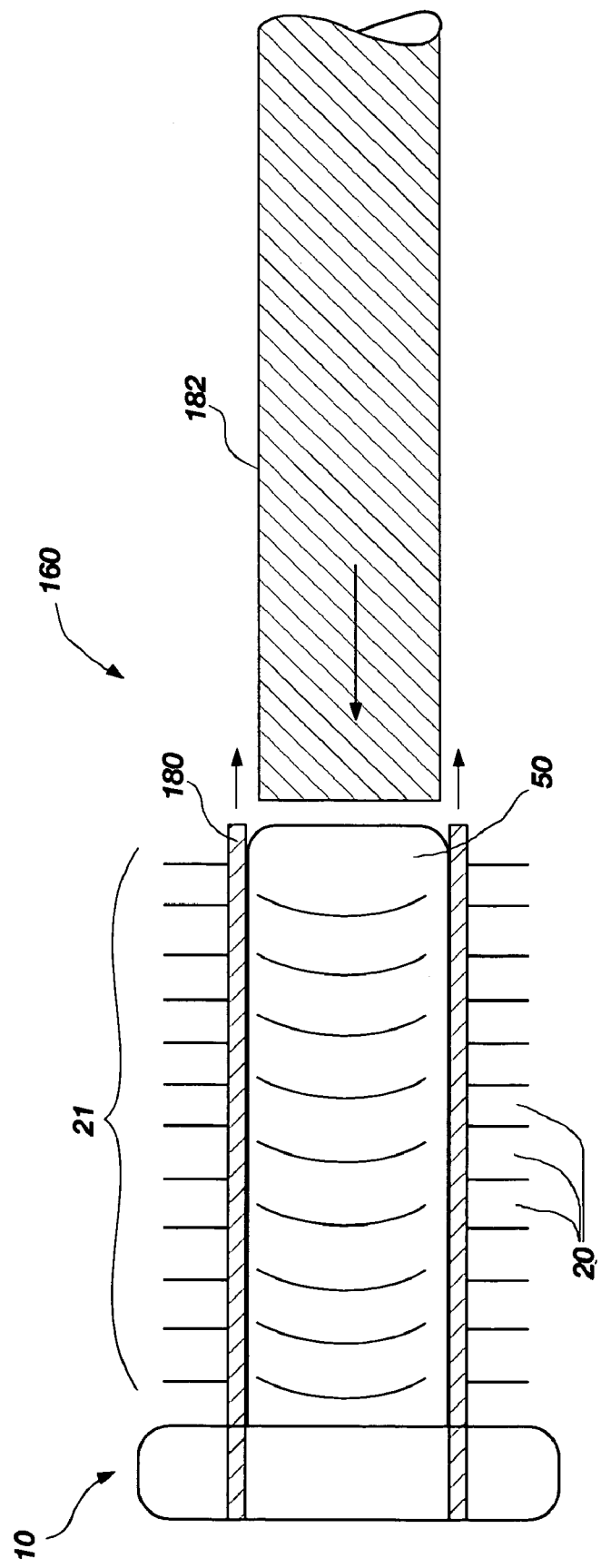

Referring to drawing FIGS. 8(a)-8(c), a bladder insert tool 160 and its manner of use is illustrated in accordance with an embodiment of the present invention. Bladder insert tool 160 may include a thin-walled, rigid tube 180 that is shaped to fit in the assembled compaction device 10 where the bladder 50 is located (i.e., within the openings 32 of the sliding segments 26). The bladder insert tool 160 also includes a rigid insert 182 that fits into the tube 180 with a sliding fit and is longer than the tube 180. When a bladder needs to be replaced, the old bladder is pulled out of the roller and the bladder insert tool 160 containing a new bladder 50 filled with incompressible fluid is inserted into the roller assembly 21 (FIG. 1). The rigid tube 180 is then removed while using the rigid insert 182 to hold the bladder in place inside the roller assembly.

Thus, for example, drawing FIG. 8(*a*) illustrates a deflated bladder 50 located inside a rigid tube 180 of a bladder insert tool 160. The bladder 50 is filled with an incompressible fluid and sealed (FIG. 8(*b*)). The rigid tube 180 is inserted into the assembled compaction device 10 and then removed using the rigid insert 182 to hold the bladder 50 in place while the tube 180 is pulled out of the compaction device 10 (FIG. 8(*c*)).

Figure 9:
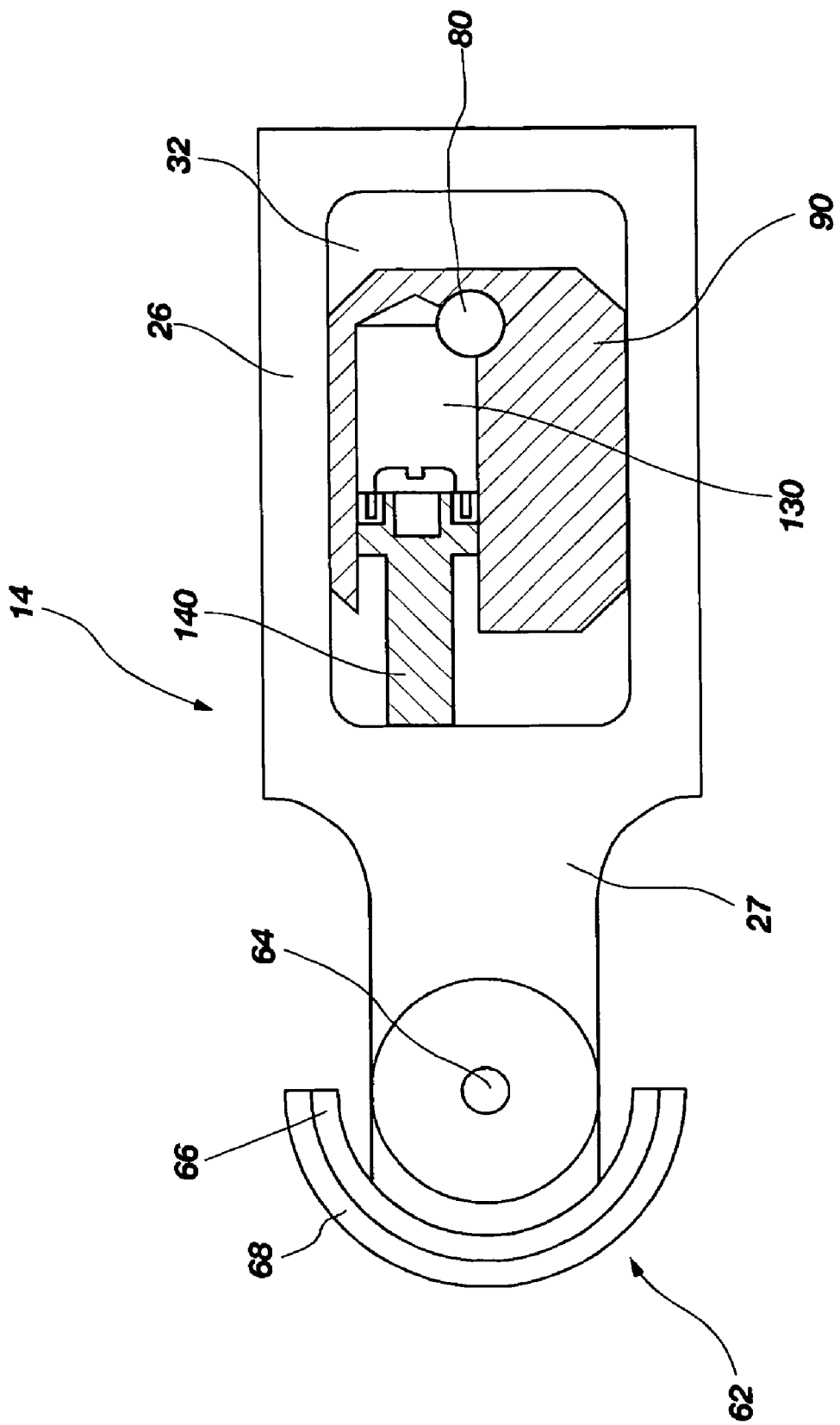
FIG. 9 illustrates a sectional view of a compaction device segment including a pivoting compaction head.

Another embodiment of the individual compaction segments 14 is illustrated in drawing FIG. 9, a plurality of compaction segments 14 form a compaction element. The compaction segment 14 includes a sliding segment 26 with a hole wherein a rigid member 90 including either a pressure bladder or a plurality of cylinders 130 is disposed. In the embodiment shown in drawing FIG. 9, each cylinder 130 is interconnected via hydraulic passageway 80, wherein a change in the position of a piston 140 of any segment 14, results in an equal but opposite reaction in the remaining pistons 140. The sliding element tapers to a neck 27 where a compaction head 62 is connected. The compaction head 62 may be a rigid shoe 66 having a convex surface which contacts the composite structure or the rigid shoe 66 may include a cover 68. Cover 68 may be included to reduce friction or to improve compliance between the compaction head 62 and the composite structure being formed. Some materials contemplated for the cover 68 include, an elastomeric material, plastic, polyethylene or HDPE. Compaction head 62 may be rigidly attached to the sliding element neck 27, or the connection may be articulated, or it may be a simple pivot including a pivot pin 64. If an articulated connection is made, the shape of the compaction head 62 may be constructed to resemble a convex bowl, rather than a shoe, thereby allowing tangential fluid contact with complex shapes of the composite structure. Additionally the compaction head 62 may be cooled, heated or vibrated to aid consolidation of the fiber tows.

The compaction element 14 illustrated in drawing FIG. 9 enjoys the same functionality as a compaction roller segment 20, shown in drawing FIGS. 1, 2 and 4 through 7, and are substantially interchangeable. For example a plurality of compaction elements 14 can readily be installed on the frame including a bladder 50 disclosed in drawing FIGS. 1 and 2 or equally disposed on the assembly including hydraulic elements as shown in drawing FIG. 4 through 8. As such the above description for drawing FIG. 1 through 8 substantially applies to the compaction element 14 illustrated in drawing FIG. 9.

Figure 10:
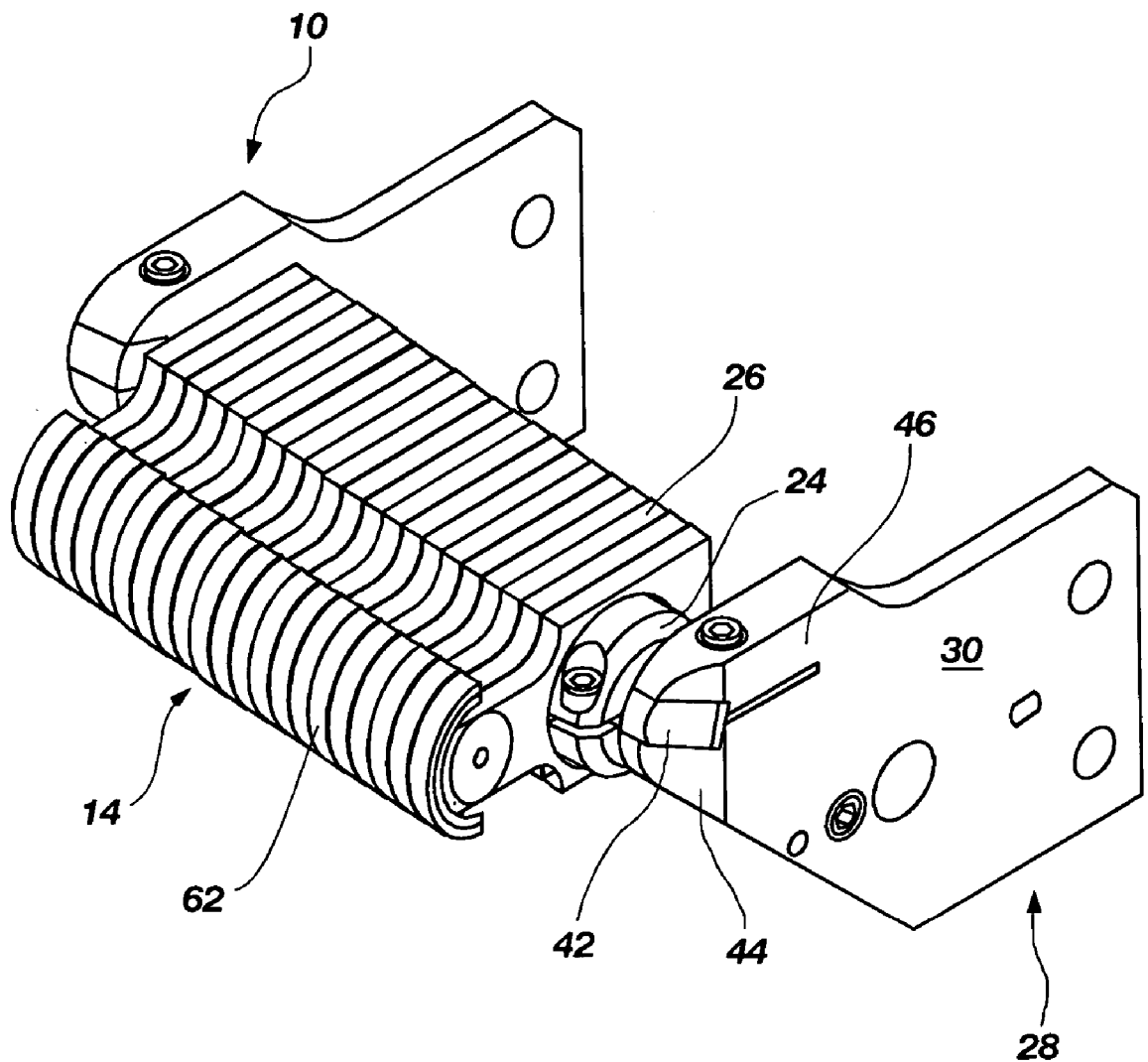
FIG. 10 illustrates a perspective view of a compaction device in accordance with an embodiment of the present invention, including a fixed compaction head.

Referring now to drawing FIG. 10, a perspective view of a compaction device 10 is illustrated in accordance with one embodiment of the present invention including a fixed or sliding compaction head 62. The compaction elements 14, shown in greater detail in drawing FIG. 9, are configured in a spaced apart, side-by-side relationship and axially constrained by collar[s] 24. The compaction elements 14 are movable interdependent of one another such that the compaction element 14 of the compaction device 10 for conforming to complex geometric surfaces of a part being formed and apply a uniform pressure against the entire surface, therefore improving consolidation of the material being fabricated. To provide support to the individual compaction elements 14, a support means is provided by a support structure 28 that may include, for example, end plates 30, mounting ears 42, which engage with slots 44 formed in a pair of support arms 46.

While the present invention of a fiber compaction device has been described in relation to fabricating composite structures or parts, it may be used in any instance where a it is desirable to have a roller having interdependent segments to follow a work surface, such as in compacting devices used for materials having variable density and/or irregular surfaces, apparatus used to follow surfaces of objects, gripping and clamping devices used in robotics, fabricating tires, applying coatings, applying adhesives, painting irregular surfaces, etc.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A compaction device for uniformly compacting against an irregular surface, the device comprising:
 a plurality of individual compactor segments disposed in a side-by-side relationship, each compactor segment interfacing with a fixed volume containment assembly;
 a substantially incompressible medium received within the fixed volume containment assembly, the incompressible medium in the fixed volume containment assembly causing the plurality of individual compactor segments to be interdependent in movement in relation to each other when pressed against a surface; and
 a volume adjustment member configured and arranged to change the volume of the fixed volume containment assembly.

2. The device of claim 1 further comprising:
 each compactor segment having an inner opening;
 a stationary axis shaft received in the inner opening of each compactor segment, the stationary shaft including a passage and a cylinder for each compactor segment, the passage in fluid communication with each cylinder, the passage and cylinders forming at least in part the fixed volume containment assembly; and
 a piston received in each cylinder.

3. The device of claim 2, wherein each compactor segment further comprises:
 a sliding segment engaged with an associated piston to selectively move the compactor segment.

4. The device of claim 3, wherein each compactor segment further comprises:
 an outer surface; and
 a ring bearing positioned between the sliding segment and the outer surface, the ring bearing configured and arranged to allow the outer surface to rotate independent of the sliding member.

5. The device of claim 3, further comprising;
 a piston guide to guide each piston to its associated sliding segment.

6. The device of claim 1, wherein the volume adjustment control is manually adjustable.

7. The device of claim 1, wherein the volume adjustment control is servo controlled.

8. The device of claim 1, wherein the fixed volume containment assembly includes a bladder.

9. The device of claim 8, wherein the volume adjustment member further comprises:
a bladder pressure collar configured and arranged to be received around the bladder; and
a bladder containment surface member adjustably coupled to the bladder pressure collar.

10. The device of claim 1, further comprising:
a vibrator apparatus coupled to vibrate the plurality of individual compactor segments.

11. A compaction device for uniformly compacting against an irregular surface, the device comprising:
a plurality of individual compactor segments disposed in a side-by-side relationship, each compactor segment including a sliding segment having an inner opening;
a stationary axis shaft received within the inner opening of each sliding segment of the plurality of individual compactor segments;
a fixed volume containment assembly at least in part also received within the inner opening of each sliding element of the plurality of individual compactor segments;
a substantially incompressible medium received within the fixed volume containment assembly, the incompressible medium in the fixed volume containment assembly causing the plurality of individual compactor segments to be interdependent in movement in relation to each other when pressed against a surface; and
a volume adjustment member configured and arranged to change the volume of the fixed volume containment member.

12. The device of claim 11, wherein each compactor segment further comprises:
an outer surface; and
a ring bearing positioned between the sliding segment and the outer surface, the ring bearing configured and arranged to allow the outer surface to rotate independent of the sliding member.

13. The device of claim 11, further comprising:
the stationary axis shaft having a chamber for each compactor segment and a passage that is in fluid communication with each chamber, the passage and chambers in the stationary axis shaft forming at least part of the fixed volume containment assembly; and
a piston received in each chamber, each position configured and arranged to engage an associated slide member.

14. The device of claim 13, further comprising;
a piston guide to guide each piston to its associated sliding segment.

15. The device of claim 11, wherein the volume adjustment control is manually adjustable.

16. The device of claim 11, wherein the volume adjustment control is servo controlled.

17. The device of claim 11, wherein the fixed volume containment assembly includes at least one bladder, the at least one bladder containing the substantially incompressible medium, the bladder positioned to abut the stationary axis shaft.

18. The device of claim 17, wherein the volume adjustment member further comprises:
a bladder pressure collar configured and arranged to be received around the bladder and the stationary axis shaft; and
a bladder containment surface member adjustably coupled to the bladder pressure collar.

19. The device of claim 11, further comprising:
a vibrator element coupled to vibrate the plurality of individual compactor segments.

20. The device of claim 11, wherein the individual compactor segments are individual compaction shoes.

* * * * *